US010237622B2

(12) United States Patent
Yan et al.

(10) Patent No.: US 10,237,622 B2
(45) Date of Patent: Mar. 19, 2019

(54) PAGE TURNING METHOD, PAGE TURNING APPARATUS AND TERMINAL AS WELL AS COMPUTER READABLE MEDIUM

(71) Applicant: TENCENT TECHNOLOGY (SHENZHEN) COMPANY LIMITED, Shenzhen (CN)

(72) Inventors: Wei Yan, Shenzhen (CN); Guang Yang, Shenzhen (CN); Qinghua Zhong, Shenzhen (CN); Yinglei Liang, Shenzhen (CN); Rui Rao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 8 days.

(21) Appl. No.: 14/329,391

(22) Filed: Jul. 11, 2014

(65) Prior Publication Data
US 2014/0380375 A1    Dec. 25, 2014

Related U.S. Application Data

(63) Continuation of application No. PCT/CN2013/090141, filed on Dec. 20, 2013.

(30) Foreign Application Priority Data

Jun. 19, 2013   (CN) .......................... 2013 1 0244227

(51) Int. Cl.
   *H04N 5/445*   (2011.01)
   *H04N 21/482*   (2011.01)
   (Continued)

(52) U.S. Cl.
   CPC ............. *H04N 21/482* (2013.01); *G06F 3/03* (2013.01); *H04N 21/4438* (2013.01); *H04N 21/47202* (2013.01)

(58) Field of Classification Search
   CPC ............. H04N 21/482; H04N 21/4438; H04N 21/47202; G06F 3/03
   (Continued)

(56) References Cited

U.S. PATENT DOCUMENTS

| 6,590,595 B1 * | 7/2003 | Wagner ............... G06F 3/04855 715/772 |
| 2005/0216936 A1 * | 9/2005 | Knudson ................ G06Q 30/02 725/42 |

(Continued)

FOREIGN PATENT DOCUMENTS

| CN | 101833416 A | 9/2010 |
| CN | 102117163 | 7/2011 |

(Continued)

OTHER PUBLICATIONS

International Search Report and Written Opinion dated Feb. 27, 2014 in corresponding PCT Application No. PCT/CN2013/090141, 10 pages.

(Continued)

*Primary Examiner* — John R Schnurr
(74) *Attorney, Agent, or Firm* — Oblon, McClelland, Maier & Neustadt, L.L.P.

(57) ABSTRACT

The invention discloses a page turning method, a page turning apparatus and a terminal as well as a computer readable medium, and belongs to the field of computer technology. The method includes: receiving a continuing page turning signal; performing page turning on the pages according to a predefined single page turning mode; if the page turning mode change condition is met, performing page turning on the pages according to a predefined fast page turning mode, page turning speed of the fast page turning mode being larger than page turning speed of the single page (Continued)

turning mode. The technology realizes effects of fast page turning and reduced page turning time.

21 Claims, 10 Drawing Sheets

(51) Int. Cl.
    *G06F 3/03*     (2006.01)
    *H04N 21/443*     (2011.01)
    *H04N 21/472*     (2011.01)

(58) Field of Classification Search
    USPC .......................................................... 725/52
    See application file for complete search history.

(56) References Cited

U.S. PATENT DOCUMENTS

| | | | |
|---|---|---|---|
| 2006/0282858 A1* | 12/2006 | Csicsatka | G06F 3/0485 |
| | | | 725/52 |
| 2008/0079972 A1* | 4/2008 | Goodwin | G06F 3/0485 |
| | | | 358/1.12 |
| 2009/0070840 A1 | 3/2009 | Kamimaki et al. | |
| 2009/0100373 A1* | 4/2009 | Pixley | G06F 3/03543 |
| | | | 715/786 |
| 2011/0050594 A1* | 3/2011 | Kim | G06F 3/04847 |
| | | | 345/173 |
| 2011/0258523 A1 | 10/2011 | Song | |
| 2011/0302510 A1* | 12/2011 | Harrison | G06F 17/2247 |
| | | | 715/760 |
| 2012/0206498 A1* | 8/2012 | Kai | G06F 3/0482 |
| | | | 345/684 |
| 2013/0141453 A1* | 6/2013 | Devara | G09G 5/10 |
| | | | 345/589 |

FOREIGN PATENT DOCUMENTS

| | | |
|---|---|---|
| CN | 102411618 A | 4/2012 |
| CN | 102651001 A | 8/2012 |

OTHER PUBLICATIONS

Office Action dated Nov. 1, 2016 and its concise explanation of relevance in English from corresponding application No. CN 201310244227.6.

Office Action dated Mar. 31, 2017 and its concise explanation of relevance in English from corresponding application No. CN 201310244227.6.

\* cited by examiner

PAGE TURNING METHOD, PAGE TURNING APPARATUS AND TERMINAL AS WELL AS COMPUTER READABLE MEDIUM

CROSS-REFERENCE TO RELATED APPLICATIONS

This application is a continuation application of PCT Patent Application No. PCT/CN2013/090141, entitled "PAGE TURNING METHOD, PAGE TURNING APPARATUS AND TERMINAL AS WELL AS COMPUTER READABLE MEDIUM" filed on Dec. 20, 2013, which claims the priority benefit of Chinese Patent Application No. 201310244227.6, filed on Jun. 19, 2013, titled "Page Turning Method, Page Turning Apparatus and Terminal", which is herein incorporated by reference in its entirety.

TECHNICAL FIELD

The invention relates to the field of computer technology, and in particular to a page turning method, a page turning apparatus and a terminal as well as a computer readable medium.

BACKGROUND

Nowadays, with rapid development of smart televisions and digital set top boxes, users use a Video-On-Demand (VOD) function of the smart televisions and the digital set top boxes more and more frequently.

At present, the smart televisions normally are configured with VOD pages for displaying television programs in pages, in which the VOD pages are configured with page turning instructions, and a remote controller corresponding to the smart television is configured with an UP button, a DOWN button, a LEFT button, a RIGHT button and a CONFIRM button, the current VOD page of the smart television will display focused objects in lines and columns for identifying available television programs, and a focus point can be jumped among these focused objects according to signals triggered by the buttons of the remote controller. With respect to the video-on-demand page and the remote controller, there is a page turning method, and this method may include: firstly displaying a focus on a current video-on-demand page of a smart television, a user can make the focus jump onto the next line of focused objects on the current video-on-demand page by triggering the DOWN button on the remote controller, and when the focus jumps to the last line of focused objects on the current video-on-demand and the DOWN button on the remote controller is triggered again, the focus on the smart television will jump onto a page turning instruction displayed on the current video-on-demand page, and at this time, if the CONFIRM button on the remote controller is triggered, it is possible to realize the page turning operation on the video-on-demand page.

During the process of implementing the invention, the inventor found that there are at least the following problems in the prior art: when performing a television program video-on-demand with the above method, each time when turning the video-on-demand page, it is necessary to make the focus jump onto the page turning instruction after several jumps among the focused objects on the video-on-demand page, and meanwhile trigger the CONFIRM button on the remote controller to perform page turning so as to finish this page turning operation, so it takes long time to perform page turning on the video-on-demand page each time. When the Television (TV) program the user wants to watch is after tens or hundreds of pages, the focus needs to be continuously jumped on the focused objects on the video-on-demand page and the page turning instruction, which takes a relatively long time.

SUMMARY

In order to solve the problem of requiring the focus point to continuously jump on the multiple lines of focused objects and the page turning instruction on the VOD pages when page-turning the VOD pages and wasting too long time in the prior art, embodiments of the invention provide a page turning method, a page turning apparatus and a terminal as well as a computer readable medium. The technical solutions are as follows:

In a first aspect, it is provided a page turning method, used in a terminal displaying at least two sequential pages, comprising steps of:

receiving a continuing page turning signal;

in response to receiving the continuing page turning signal, performing page turning on the pages according to a predefined single page turning mode;

detecting whether a page turning mode change condition is met;

if it is detected that the page turning mode change condition is met, performing page turning on the pages according to a predefined fast page turning mode, page turning speed of the fast page turning mode being larger than page turning speed of the single page turning mode.

In a second aspect, it is provided a page turning apparatus, used in a terminal displaying at least two sequential pages, comprising:

a first receiving module configured to receive a continuing page turning signal;

a first page turning module configured to, in response to that the first receiving module receives the continuing page turning signal, perform page turning on the pages according to a predefined single page turning mode;

a detecting module configured to detect whether a page turning mode change condition is met; and a second page turning module configured to, if it is detected that the page turning mode change condition is met, perform page turning on the pages according to a predefined fast page turning mode, page turning speed of the fast page turning mode being larger than page turning speed of the single page turning mode.

In a third aspect, it is provided a terminal including the page turning apparatus provided in the second aspect.

In a fourth aspect, it is provided A non-transitory computer readable medium, with a computer executable program stored thereon, the computer executable program, when being run, executes a page turning method in the first aspect.

The effects brought by the technical solutions provided by the embodiments of the invention include for example, but not limited to:

In response to receiving the continuing page turning signal, page turning is performed on the pages according to a predefined single page turning mode; when a page turning mode change condition is met in the terminal, page turning is performed on the pages according to a predefined fast page turning mode, and page turning speed of the fast page turning mode is larger than page turning speed of the single page turning mode; it solves the problem of requiring the focus point to continuously jump on the multiple lines of focused objects and the page turning instruction on the VOD pages when page-turning the VOD pages and wasting too long time; it realizes effects of fast page turning and reduced page turning time.

BRIEF DESCRIPTION OF THE DRAWINGS

In order to more clearly explain the technical solutions of the embodiments of the invention, the drawings used for description of the embodiments will be briefly introduced hereinafter, and obviously, the drawings below are only showing some embodiments of the invention, and a person skilled in the art can infer other drawings from these drawings without inventive labor.

DETAILED DESCRIPTION

In order to make objects, technical solutions and advantages of the invention clearer, the implementations of the invention will be further described in detail with reference to the drawings.

Figure 8:
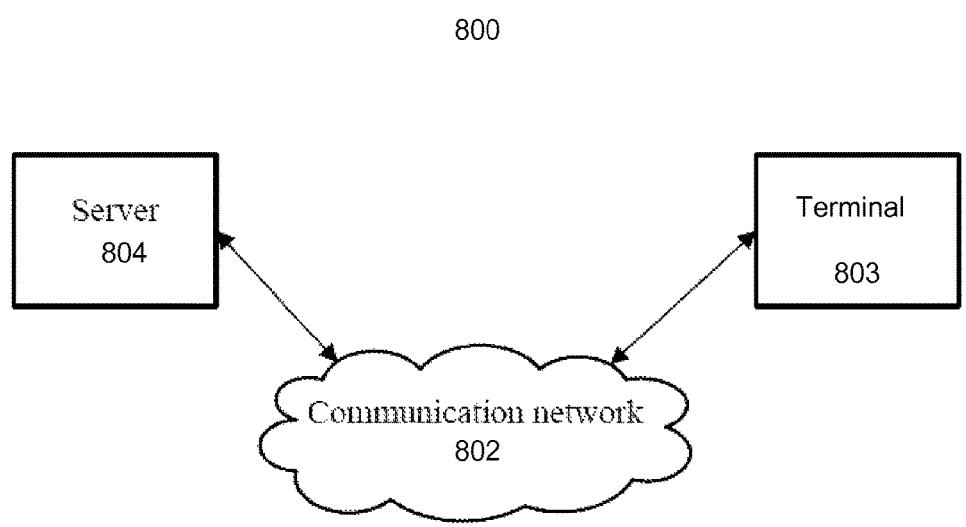
FIG. 8 is a diagram of an environmental scene in which embodiments of the invention are applied.

FIG. 8 is a diagram of an environmental scene in which embodiments of the invention are applied. The exemplary environment may include a server 804, a terminal 803, and a communication network 802. The server and the terminal may be coupled through the communication network for information exchange, such as sending/receiving identification information, sending/receiving data files, etc. Although only one terminal and one server are shown in the environment, any number of terminals or servers may be included, and other devices may also be included. The communication network may include any appropriate type of communication network for providing network connections to the server and terminal or among multiple servers or terminals. For example, communication network may include the Internet or other types of computer networks or telecommunication networks, either wired or wireless. In a certain embodiment, the disclosed methods and apparatus may be implemented, for example, in a wireless network that includes at least one terminal.

Figure 1:
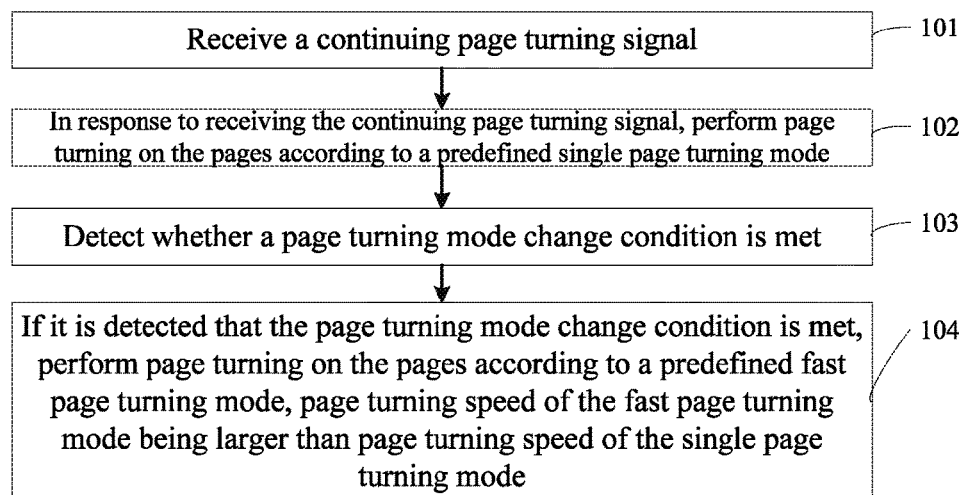
FIG. 1 is a process flowchart of a method for page turning provided by an embodiment of the invention.
Figure 9:
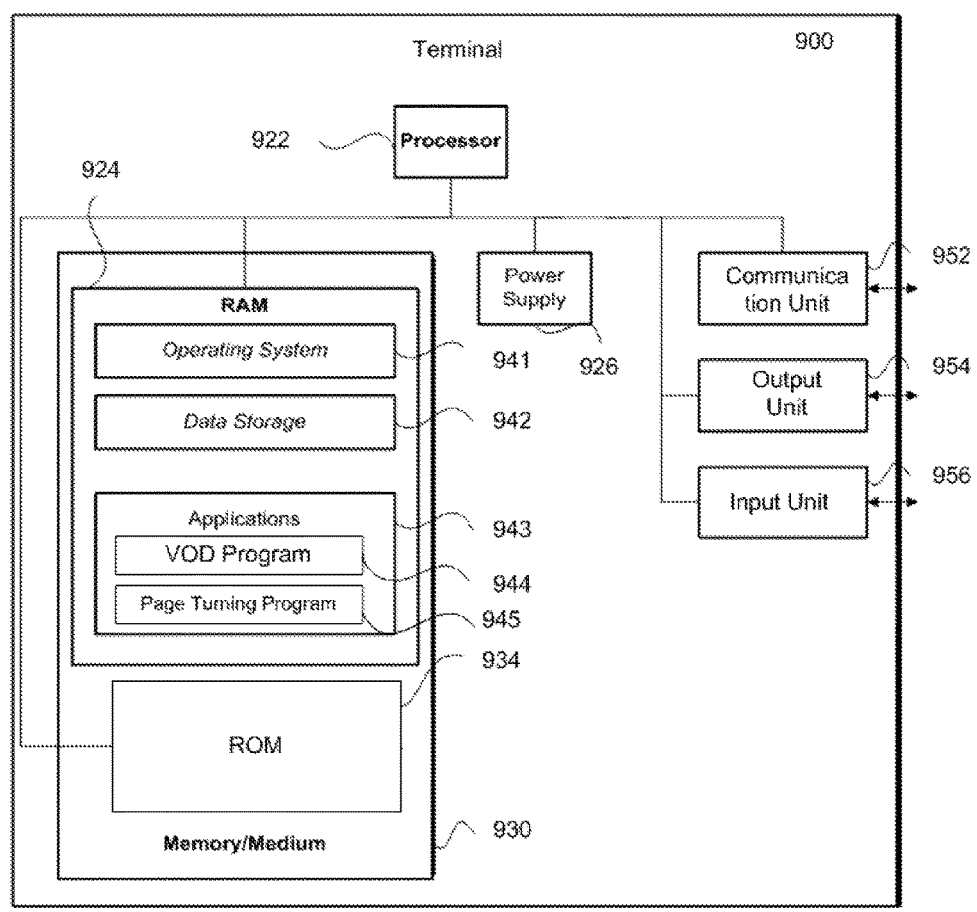
FIG. 9 is a block diagram of an example of a mobile terminal in embodiments of the invention.

FIG. 9 is a block diagram of an example of a terminal in embodiments of the invention. As shown in FIG. 9, an example of a terminal 900 may include: a processor 922, a storage/medium 930 including Random Access Memory (RAM) 924, Read-Only Memory (ROM) 934, a power supply 926, a communication unit 952, an output unit 954, and an input unit 956. In the RAM 924, operating system 941, data storage 942, and applications 943 may be stored. The application programs 943 may include for example a VOD program 944, a page turning program 945 and so on. The input unit 956 may include keyboard, microphone and so on. The output unit 954 may include display, speaker and so on. The communication unit 952 may be in charge of communicating with the server 804 via the communication network 802 as shown in FIG. 8. The methods mentioned in this disclosure may be implemented by an application program in a terminal Now refer to FIG. 1, which is a process flowchart of a method for page turning provided by an embodiment of the invention. The method for page turning can be applied in a terminal which may be a multimedia television, a personal computer, a digital camera, a digital photo album, a cellular phone or an e-reader and so on. The method for page turning may include the following steps.

In step 101, a continuing page turning signal is received.

The continuing page turning signal may be a signal generated by a user continuously triggering a page turning button disposed on a remote controller. The remote controller can be used to control the terminal, and when a user continuously triggers a page turning button disposed on the remote controller, the remote controller would generate a continuing page turning signal, and send this continuing page turning signal to the terminal; and correspondingly, the terminal would receive this continuing page turning signal. When the user no longer triggers the page turning button on the remote controller, the continuing page turning signal ends. In another embodiment, when the user no longer triggers the page turning button on the remote controller, an ending page turning signal may be generated.

The continuing page turning signal may further be a signal generated by a user continuously triggering a page turning button disposed on the terminal. When the terminal is configured with a page turning button, the user may trigger the page turning button on the terminal through a touch screen, or through a button on the terminal, and when the page turning button on the terminal is continuously triggered by the user, a continuing trigger signal would be generated. When the user no longer triggers the page turning button, the continuing trigger signal ends. In another embodiment, when the user no longer triggers the page turning button, an ending page turning signal may be generated.

The continuing page turning signal may further be a signal generated by the user touching and sliding in a predetermined direction on the touch screen of the terminal and continuously pressing on the touch screen at a position where the sliding ends.

In step 102, in response to receiving the continuing page turning signal, page turning is performed on pages according to a predefined single page turning mode.

The page may be a VOD page, on which for example at least one line and/or at least one column of TV programs are displayed; the page may be a reading page, on which for example at least one line and/or column of text content is displayed, and each line/column includes at least one word; and the page may further be a photo album browsing page, on which for example at least one line and/or at least one column of photos are displayed.

Of course, in practice, the page can be configured with other contents, for example, when the page is a VOD page, the VOD page can be configured with a TV program category list in addition to the TV programs selectable by the users, and each category in the category list may correspond to multiple pages of VOD pages. Normally, the TV program category list does not vary with different VOD pages, so the "page turning" mentioned below only refers to performing page turning on the part of the page where the TV program is located, but not page turning on the category list.

In step 103, it is detected whether a page turning mode change condition is met.

In practice, the detecting of whether a page turning mode change condition is met may include the following cases:

detecting whether the number of the turned pages, when the pages are being turned according to the predefined single page turning mode, is larger than a predefined turned page threshold;

That is, page turning is performed on the pages according to the predefined single page turning mode, and the number of the turned pages is accumulated, and when the accumulated number of the turned pages is larger than a predefined page turning threshold, or after a certain time lapses, it can be determined that the detection result is that the page turning mode change condition is met. For example, the predefined page turning threshold is set to two, and when three pages are turned according to the single page turning mode, the detection result is that the page turning mode change condition is met.

It is detected whether a duration of the continuing page turning signal exceeds a predefined time threshold.

Since the terminal performs page turning according to the single page turning mode immediately after receiving the continuing page turning signal, the duration of the continuing page turning signal is normally the same with the time for performing page turning according to the single page turning mode. Herein the predefined time threshold may be set to eight or ten seconds or else. The embodiment does not limit the particular value of the predefined time threshold.

In step 104, if it is detected that the page turning mode change condition is met, page turning is performed on the pages according to a predefined fast page turning mode, page turning speed of the fast page turning mode being larger than page turning speed of the single page turning mode.

That is, after several pages are turned according to the single page turning mode, and at this time, the page turning mode change condition is met, which indicates that the user wants to continuously turn pages, i.e., the page which the user wants to locate is at the back, so at this time, in order to reduce the page turning time, page turning can be performed on the pages according to the fast page turning mode with a larger speed. In order to improve the page turning speed, generally speaking, the page turning speed of the fast page turning mode is faster than the page turning speed of the single page turning mode.

In all, with the page turning method provided by the embodiment of the invention, in response to receiving the continuing page turning signal, page turning is performed on the pages according to a predefined single page turning mode; when a page turning mode change condition is met in the terminal, page turning is performed on the pages according to a predefined fast page turning mode, and page turning speed of the fast page turning mode is larger than page turning speed of the single page turning mode; it solves the problem of requiring the focus point to continuously jump on the multiple lines of focused objects and the page turning instruction on the VOD pages when page-turning the VOD pages and wasting too long time; and since the user knows the page where the commonly-viewed content is located, if this page is after tens or hundreds of pages, page turning can be performed according to the fast page turning mode with a larger speed, thus, it realizes effects of fast page turning and reduced page turning time.

Figure 2A:
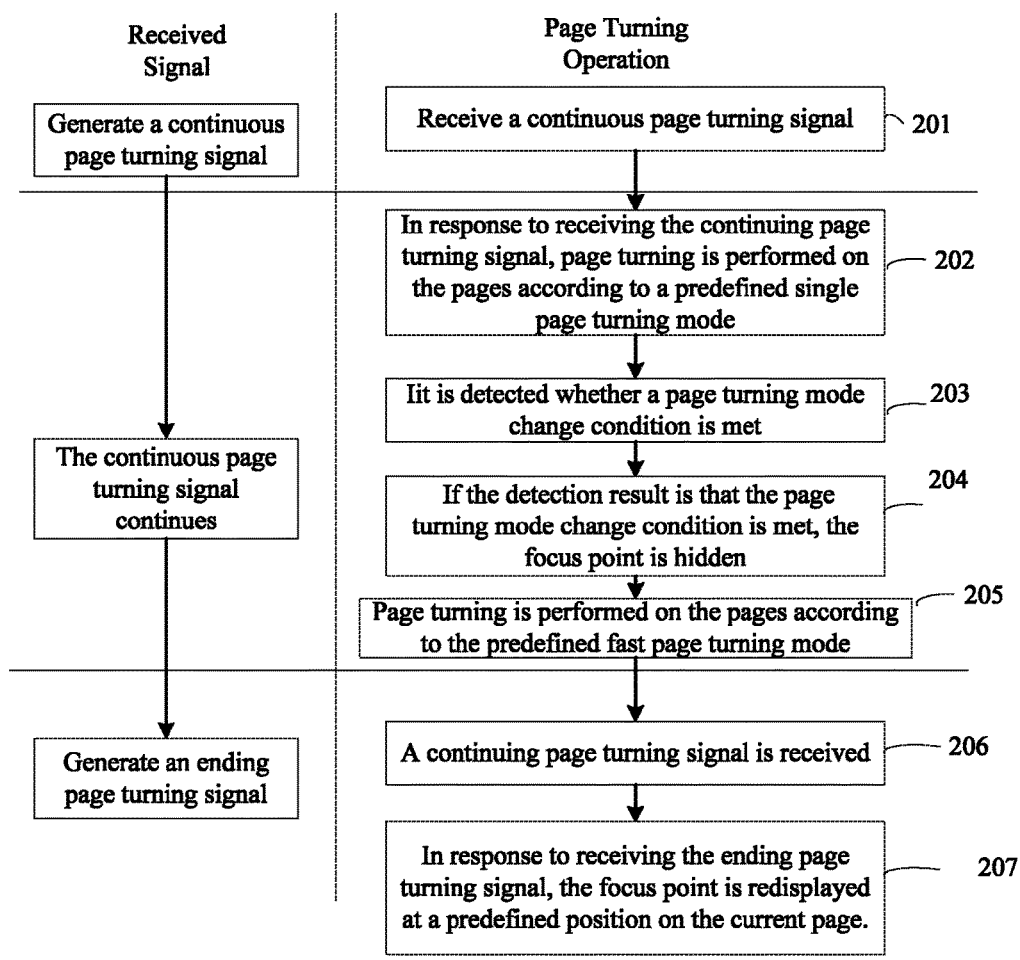
FIG. 2A is a process flowchart of a method for page turning provided by another embodiment of the invention.

Refer to FIG. 2A, which is a process flowchart of a method for page turning provided by another embodiment of the invention. The method for page turning can be applied in a terminal which may be a multimedia television, a personal computer, a digital camera, a digital photo album, a cellular phone or an e-reader and so on. The method for page turning may include the following steps.

In step 201, a continuing page turning signal is received.

The continuing page turning signal may be a signal generated by a user continuously triggering a page turning button disposed on a remote controller. The remote controller can be used to control the terminal, and when a user continuously triggers a page turning button disposed on the remote controller, the remote controller would generate a continuing page turning signal, and send this continuing page turning signal to the terminal; and correspondingly, the terminal receives this continuing page turning signal. When the user no longer triggers the page turning button on the remote controller, the continuing page turning signal ends. In another embodiment, when the user no longer triggers the page turning button on the remote controller, an ending page turning signal may be generated.

The continuing page turning signal may further be a signal generated when a user continuously triggering a page turning button disposed on the terminal. When the terminal is configured with a page turning button, the user may trigger the page turning button on the terminal by touching the screen, or by pressing a key on the terminal, and when the page turning button on the terminal is continuously triggered by the user, a continuing trigger signal would be generated. When the user no longer triggers the page turning button, the continuing trigger signal ends. In another embodiment, when the user no longer triggers the page turning button, an ending page turning signal may be generated.

The continuing page turning signal may further be a signal generated by the user touching and sliding in a predetermined direction on the touch screen of the terminal and continuously pressing on the touch screen at a position where the sliding ends.

In step 202, in response to receiving the continuing page turning signal, page turning is performed on the pages according to a predefined single page turning mode.

The pages is configured with at least one line and/or at least one column of focused objects, and for example, when the page is used as a VOD page for playing TV programs on demand, the focused objects are TV programs selectable by the user displayed on the VOD page, and the focus point can move on the individual TV programs. Normally, the pages are configured with multiple lines and multiple columns of focused objects, for example, the page can display two lines and five columns of focused objects. The invention does not limit the layout of the plurality of focused objects on a page.

Herein, the page may be a VOD page, on which for example at least one line and/or at least one column of TV programs are displayed; the page may be a reading page, on which for example at least one line and/or column of text content is displayed, and each line/column includes at least one word; and the page may further be a photo album browsing page, on which for example at least one line and/or at least one column of photos are displayed.

Of course, in practice, the page can be configured with other contents, for example, the page can be configured with a TV program category list in addition to the TV programs selectable by the users, and any category in the category list may correspond to multiple pages of VOD pages. Normally, the TV program category list does not vary with different VOD pages, so the "page turning" of the VOD pages exemplified below only refers to performing page turning on the VOD page where the TV program is located on the pages, but not page turning on the category list portion.

Figure 2B:
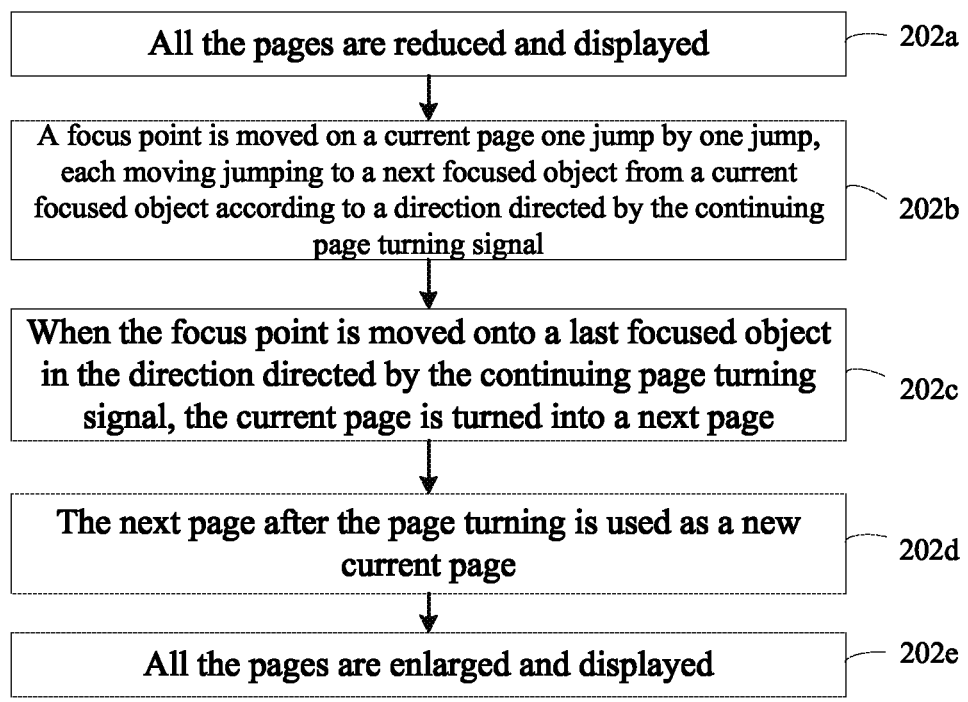
FIG. 2B is a flowchart of animated operations when performing page turning according to a single page turning mode in some embodiments of the invention.

In order to provide a better reminder service to the user, during the process of performing one-time page turning on the pages according to the single page turning mode, normally, corresponding animated operations are set to remind the user of when to start page turning, how to perform page turning and when to end page turning, as shown in FIG. 2B which shows a flowchart of animated operations when performing page turning according to the single page turning mode in some embodiments of the invention, particularly including:

In 202*a*, all the pages are reduced and displayed.

Normally, the size of each page to be turned is the same, for example, the area of pages is a first area, and thus all the pages can be reduced from the first area to a second area, and the pages reduced to the second area are displayed.

In 202*b*, a focus point is moved on a current page one jump by one jump, each moving jumping to a next focused object from a current focused object according to a direction directed by the continuing page turning signal.

The current page is the page currently displayed on the terminal's screen.

For example, there is a page displayed with three lines and three columns of focused objects, the initial position of the focus point is located at the focused object at the first line and the second column, and when the direction directed by the continuing page turning signal is downward, the focus point first moves from the focused object at the first line and the second column to the focused object at the second line and the second column, and then moves from the focused object at the second line and the second column to the focused object at the third line and the second column That is, when the direction directed by the continuing page turning signal is downward, during the focus point's one jump by one jump moving on the current page, the column position is maintained unchanged, while each jump moves to the next line.

In 202*c*, when the focus point is moved onto a last focused object in the direction directed by the continuing page turning signal, the current page is turned into a next page.

For example, there is a page displayed with three lines and three columns of focused objects, the initial position of the focus point is located at the focused object at the first line and the second column, and when the direction directed by the continuing page turning signal is downward, the focus point first moves from the focused object at the first line and the second column to the focused object at the second line and the second column, and then moves from the focused object at the second line and the second column to the focused object at the third line and the second column. Since the third line is the last line in the direction directed by the continuing page turning signal, that is, the focused object at the third line and the second column where the focus point is located is the last focused object in the direction directed by the continuing page turning signal, at this time, with the continuing page turning signal ongoing, the page is turned into a next page.

It is to be explained that when performing page turning on the pages according to the single page turning mode, the pages can be turned by a sliding way, and can be turned by other animation ways, for example, scrolling, flying in and so on. In practice, a page turning speed can also be set when performing page turning according to the single page turning mode.

In 202*d*, the next page after the page turning is used as a new current page.

In 202*e*, all the pages are enlarged and displayed.

The step 202*a* has reduced all the pages into the second area, and at this time, all the pages are enlarged from the second area to the first area, and the enlarged pages are displayed.

Herein, all the pages are reduced and displayed, so that the user can visually sense that the page turning operation is started, and all the pages are enlarged and displayed, so that the user can visually sense that the page turning operation is ended.

In another embodiment, the reducing and displaying all the pages in the step 202*a* may be after the step 202*b* and before the step 202*c*, that is, in the step 202*b*, when a focus point is moved on a current page one jump by one jump, all the pages are displayed as it is, until in the step 202*c*, when the focus point is moved onto a last focused object in the direction directed by the continuing page turning signal, the current page is about to be turned into a next page. That is, all the pages are reduced and displayed immediately before it is about to perform the page turning. Of course, the present technology is not limited hereto.

Figure 3:
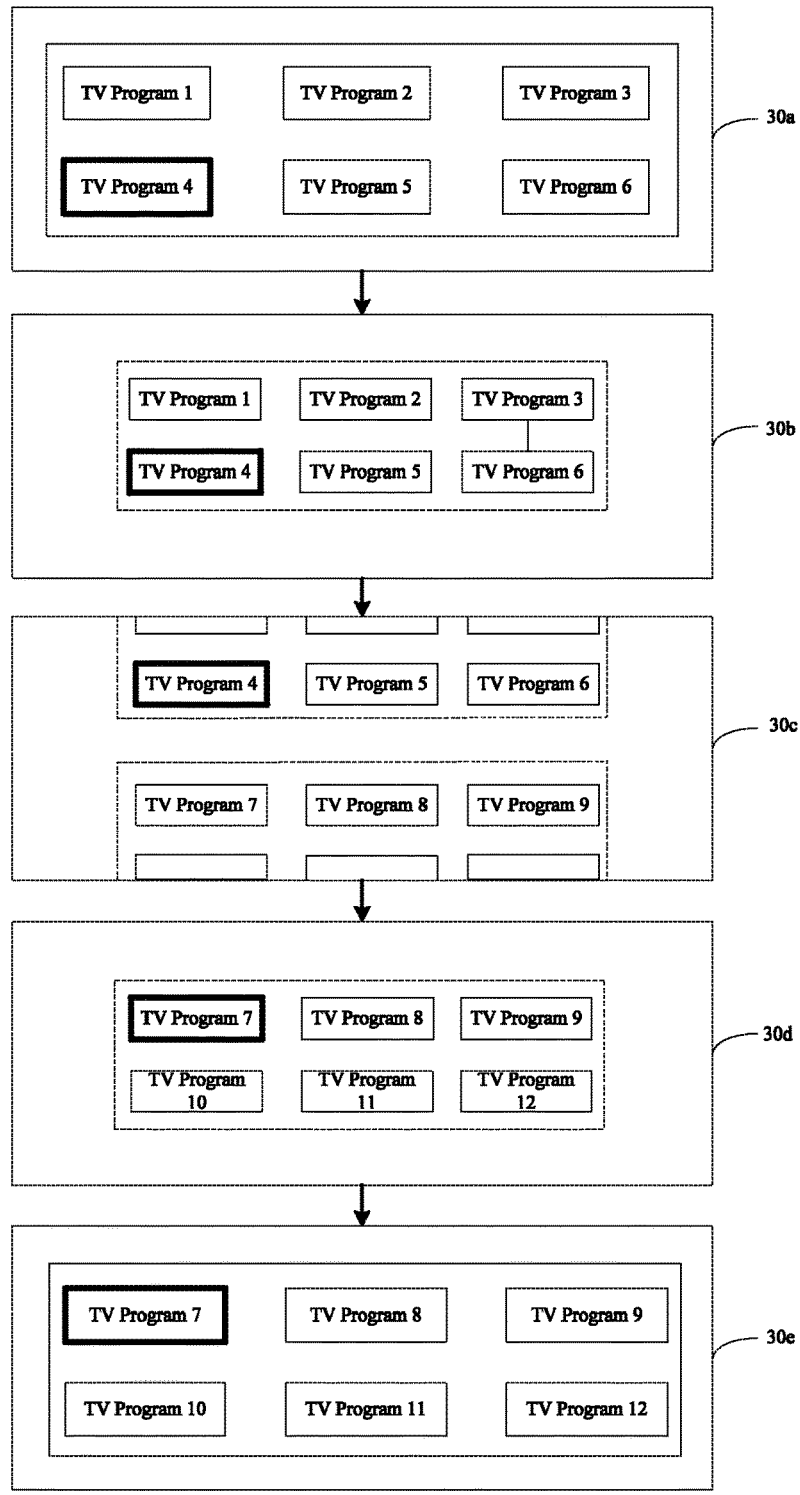
FIG. 3 is an illustrative diagram of performing page turning according to the single page turning mode in some embodiments of the invention.

For example, as shown in FIG. 3, which shows a diagram of performing page turning according to the single page turning mode in some embodiments of the invention, in which two lines and three columns of focused objects (TV programs) are displayed on each VOD page, the two adjacent pages are in an up-down structure, TV programs 1 through 6 are contents displayed by the focused objects on the first page, and TV programs 7 through 12 are contents displayed by the focused objects on the second page. The animated operations for performing page turning according to the single page turning mode may include: 30*a*, starting the page turning; 30*b*, reducing and displaying all the pages; 30*c*, moving the focus point on the current page one jump by one jump in a direction directed by the continuing page turning signal, in which for example, in FIG. 3, the direction directed by the continuing page turning signal is downward, the focus point can be moved one at a time to a focused object at the position of the next line, and normally, the focus point can be maintained unchanged in the vertical direction; 30*d*, when the focus point indicates the last line of focused objects on the current page, turning the current page turned into a next page, i.e., turning from the first page to the second page; and 30*e*, enlarging and displaying all the pages, in which the displayed second page is the enlarged page.

Obviously, the procedure of turning the second page into the third page can be implemented according to steps 202*a* to 202*e*, and so on and so forth.

In step 203, it is detected whether a page turning mode change condition is met.

In practice, the detecting of whether a page turning mode change condition is met may include the following cases.

In a first case, it is detected whether the number of the turned pages, when the pages are being turned according to the predefined single page turning mode, is larger than a predefined turned page threshold.

That is, page turning is performed on the pages according to the predefined single page turning mode, and the number of the turned pages is accumulated, and when the accumulated number of the turned pages is larger than a predefined page turning threshold, or after a certain time lapses, it can be determined that the detection result is that the page turning mode change condition is met. For example, the predefined page turning threshold is set to two, and when three pages are turned according to the single page turning mode, the detection result is that the page turning mode change condition is met.

In a second case, it is detected whether a duration of the continuing page turning signal exceeds a predefined time threshold.

Since the terminal performs page turning according to the single page turning mode immediately after receiving the continuing page turning signal, the duration of the continuing page turning signal is normally the same with the time for performing page turning according to the single page turning mode. Herein the predefined time threshold may be set to eight or ten seconds or else. The embodiment does not limit the particular value of the predefined time threshold.

In a third case, it is detected whether an intensity of the continuing page turning signal exceeds a predefined intensity threshold.

For example, when the user generates the continuing page turning signal by triggering the page turning button on the terminal, if the user increases the triggering force, the intensity of the corresponding continuing page turning signal may be increased as well, and when the intensity is larger than a predefined intensity threshold, it is indicated that the page turning mode change condition is met.

In practice, other cases of detecting whether the page turning mode change condition is met can be included, which will not be described in detail.

In step 204, if the detection result is that the page turning mode change condition is met, the focus point is hidden.

For example, when the detection result is that the page turning mode change condition is met, the displayed focus point is gradually hidden on the page.

In step 205, page turning is performed on the pages according to the predefined fast page turning mode.

Figure 2C:
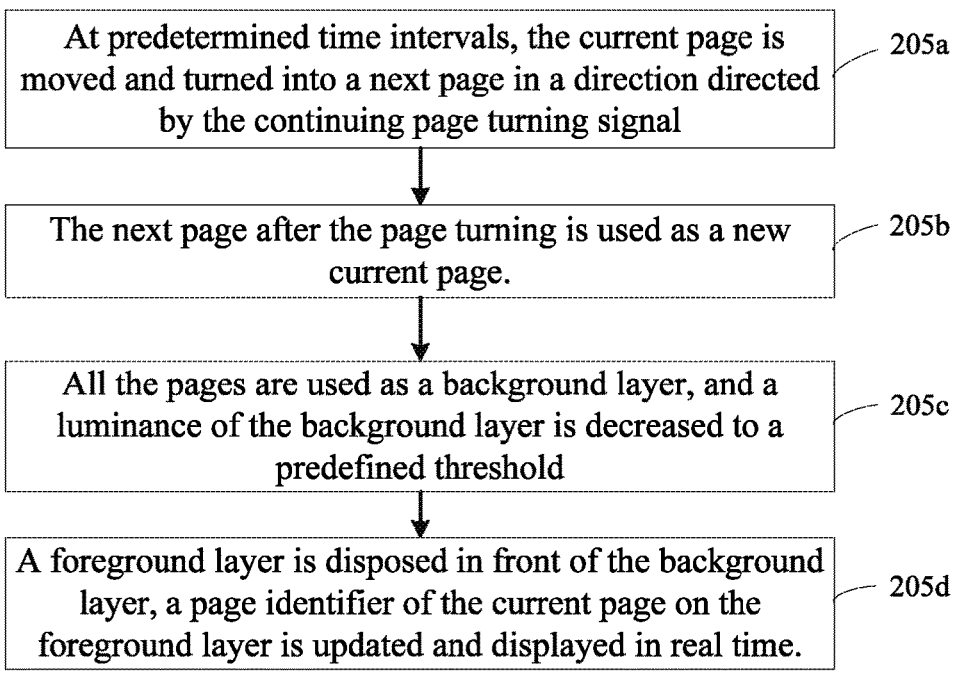
FIG. 2C is a flowchart of animated operations when performing page turning according to a fast page turning mode in some embodiments of the invention.

In the procedure of performing page turning on the pages according to the predefined fast page turning mode, normally, corresponding animated operations can be configured. As shown in FIG. 2C, which shows a flowchart of animated operations when performing page turning according to the fast page turning mode in some embodiments of the invention, the animated operations may include:

In 205*a*, at predetermined time intervals, the current page is moved and turned into a next page in a direction directed by the continuing page turning signal.

Herein the speed for performing page turning according to the fast page turning mode is larger than the speed for performing page turning according to the single page turning mode.

In 205*b*, the next page after the page turning is used as a new current page.

It can be seen that when performing page turning according to the fast page turning mode, the page turning is no longer initiated by each jump of the focus point, but initiated at predefined time intervals. Herein, the time interval can be set to one second, one point five seconds and so on. The embodiment does not limit the particular value of the predefined time intervals.

In practice, in order to ensure that the user can know the page number of the current page during the fast page turning procedure, in the procedure of performing page turning on the pages according to the predefined fast page turning mode, the page number of the page can be set with a corresponding animated operation, including: during the page turning on the pages according to the predefined fast page turning mode, updating and displaying a page identifier of the current page in real time.

The page identifier can uniquely identify the page number of the page. For example, the page identifier can be represented as "1/100", that is, there are totally 100 pages, and the current page is the first page; and further for example, the page identifier can be represented as "the fifth page", that is, the current page is the fifth page.

Since the speed when performing page turning downwards under the fast page turning mode, it is easy to generate splash phenomenon. In order to avoid the splash phenomenon generated when performing fast page turning, and in order for the user to check the page number of the current page in real time, the procedure of performing page turning on the pages according to the predefined fast page turning mode may include the following.

In 205*c*, all the pages are used as a background layer, and a luminance of the background layer is decreased to a predefined threshold.

The predefined threshold is set to small enough, and the luminance of the background layer is decreased to a predefined threshold, at this time, the displayed background layer may be relatively dark, and when performing fast page turning, the pages would not have splash phenomenon.

In 205*d*, a foreground layer is disposed in front of the background layer, a page identifier of the current page on the foreground layer is updated and displayed in real time.

Normally, the luminance of the content on the foreground layer is larger than the luminance on the background layer, to ensure that the user can easily check the page number set on the foreground layer. Similarly, in order to avoid the splash phenomenon, a page display region with the area smaller than a predefined area threshold can be set on the foreground for displaying the page identifier.

For example, the page identifier is formed by a numerical value displayed in at least one digit, when the page identifier of the current page is updated and displayed on the foreground layer in real time, the page identifier of the current page and the page identifier of the next page are compared according to the same digit; a maintaining sub-unit is configured to, for a digit having the same numerical value obtained from the comparison of the comparing sub-unit, maintain the numerical value unchanged in the digit, and for a digit having a different numerical value, update and display the numerical value corresponding to the digit in the page identifier of the next page. For example, the page identifier of the current page is "129", and the page identifier of the next page is "130", so it is known from the comparison in the same digit that, the numerical value in the ones digit is different and the numerical value in the tens digit is different, while the numerical value in the hundreds digit is the same, in this case, the numerical value in the hundreds digit is remained unchanged, but the numerical value in the ones digit is updated and displayed as "3", and the numerical value in the tens digit is updated and displayed as "0".

Figure 4:
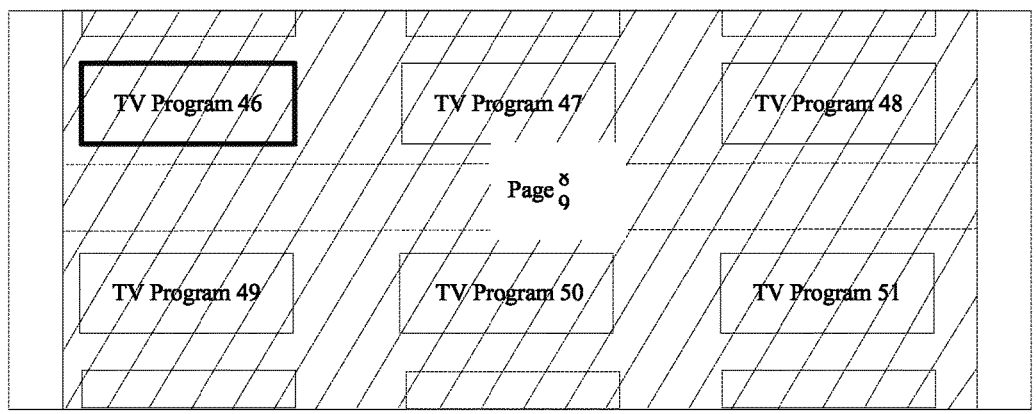
FIG. 4 is an illustrative diagram of an animation of a page identifier set when performing page turning according to the fast page turning mode in some embodiments of the invention.

Refer to FIG. 4 which shows an illustrative diagram of an animation of a page identifier set when performing page turning according to the fast page turning mode in some embodiments of the invention. In FIG. 4, the page is used as a background layer, and the luminance of the background layer is decreased, so that the splash phenomenon can be avoided; and a foreground layer is disposed in front of the background layer, and a page display region with a relatively small area is disposed in front of the foreground layer, so as to update and display the page identifier of the current page in real time, for example, when turning the page from the 8th page to the 9th page, the "8" of the page identifier "the 8th page" can be scrolled and displayed as "9", further for example, when turning the page from the 10th page to the 11th page, the "0" of the page identifier "the 10th page" can be scrolled and displayed as "1", that is, when there are two digits representing the page number in the page identifier, if the value in the tens digit is the same, then only the value in the ones digit needs to be scrolled and updated.

It is to be noted that when the page identifier includes characters, only numerical value in the page identifiers needs to be compared.

In step 206, a continuing page turning signal is received.

The ending page turning signal is a signal generated in response to that the user continuously triggers the page turning button disposed on the remote controller and when the user stops the triggering on the page turning button. The remote controller can be used to control the terminal, and when a user continuously triggers a page turning button disposed on a remote controller, the remote controller would generate a continuing page turning signal, and send this continuing page turning signal to the terminal. Correspondingly, when the user no longer triggers the page turning button, the remote controller would generate an ending page turning signal, and send the ending page turning signal to the terminal, and the terminal would correspondingly receive the ending page turning signal.

The ending page turning signal may also be a signal generated in response to that the user continuously triggers the page turning button disposed on the remote controller and when the user stops the triggering on the page turning button. When the terminal is configured with a page turning button, the user may trigger the page turning button on the terminal by touching the screen, or by pressing a key on the terminal, and when the page turning button on the terminal is continuously triggered by the user, a continuing trigger signal would be generated, and correspondingly, when the user no longer triggers the page turning button, the remote controller would generate an ending page turning signal, and send the ending page turning signal to the terminal, and the terminal would correspondingly receive the ending page turning signal.

The ending page turning signal may further be a signal generated by the user touching and sliding in a predetermined direction on the touch screen of the terminal and continuously pressing on the touch screen at a position where the sliding ends, and then stopping the pressing on the touch screen.

In step 207, in response to receiving the ending page turning signal, the focus point is redisplayed at a predefined position on the current page.

Herein, the predefined position can be set according to the practice conditions. For example, the predefined position can be set according to the direction directed by the continuing page turning signal. For example, when the direction directed by the continuing page turning signal is downward, the predefined position may be at the first line of focused objects on the current page, and the vertical position of the focus point remains unchanged; again for example, when the direction directed by the continuing page turning signal is rightward, the predefined position may be at the first column of focused objects on the current page, and the horizontal position of the focus point remains unchanged.

Figure 5:
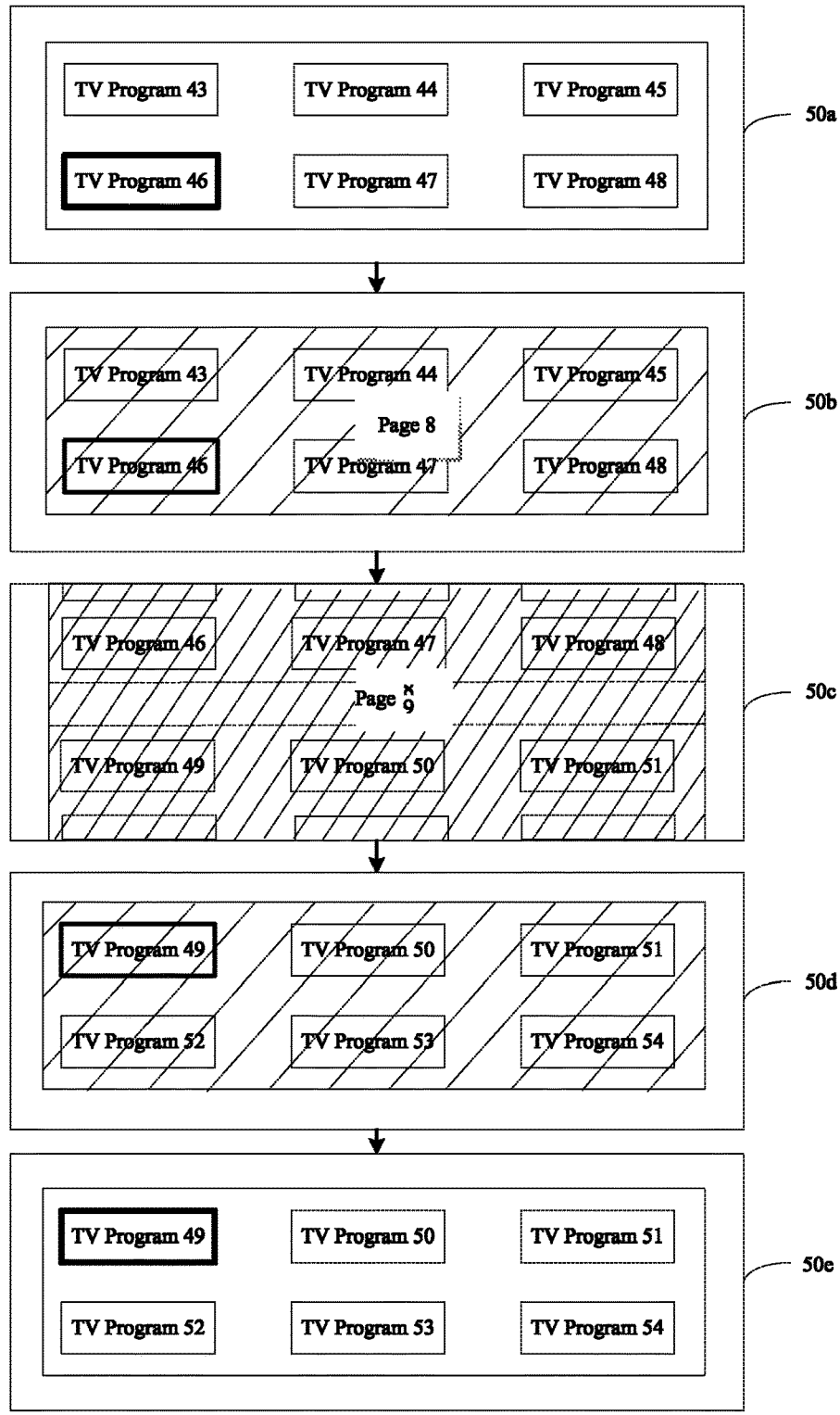
FIG. 5 is an illustrative diagram for performing page turning according to the fast page turning mode in some embodiments of the invention.

For example, refer to FIG. 5, which shows an illustrative diagram for performing page turning according to the fast page turning mode in some embodiments of the invention. With reference to FIGS. 4 and 5 it can be known that, when performing page turning according to the fast page turning mode, it includes: 50a, starting to perform page turning according to the fast page turning mode; 50b, decreasing the luminance of the background layer where all the pages are located to a predefined threshold, and gradually hiding the focus point; 50c, performing page turning on the pages, and during the page turning, updating the page identifier of the current page in real time, in which the luminance during the page turning is normally the lowest; 50d, when receiving the ending page turning signal, gradually recovering the luminance of the page, and displaying the focus point at a predefined position on the current page, vanishing the page identifier; and 50e, ending the animation.

In all, with the page turning method provided by the embodiment of the invention, in response to receiving the continuing page turning signal, page turning is performed on the pages according to a predefined single page turning mode; when a page turning mode change condition is met in the terminal, page turning is performed on the pages according to a predefined fast page turning mode, and page turning speed of the fast page turning mode is larger than page turning speed of the single page turning mode, and different animated operations are set for performing page turning in the single page turning mode and for performing page turning in the fast page turning mode, respectively; it solves the problem of requiring the focus point to continuously jump on the multiple lines of focused objects and the page turning instruction on the VOD pages when page-turning the VOD pages and wasting too long time; and since the luminance of the background layer is decreased when performing fast page turning, it realizes effects of fast page turning and reduced page turning time as well as avoiding splash and so on.

Figure 6:
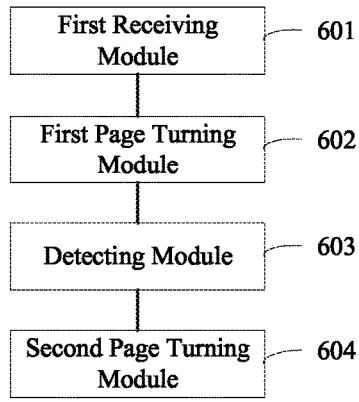
FIG. 6 is a structural illustrative diagram of an apparatus for page turning provided by an embodiment of the invention.

Now refer to FIG. 6, which shows a structural schematic diagram of a page turning apparatus provided by an embodiment of the invention. The page turning apparatus can be implemented as a terminal or a part of the terminal, and the terminal may be a multimedia television, a personal computer, a digital camera, a digital photo album, a cellular phone or an e-reader and so on. The terminal normally may display at least two sequential pages. The page turning apparatus may include but is not limited to: a first receiving module 601, a first page turning module 602, a detecting module 603 and a second page turning module 604.

The first receiving module 601 can be configured to receive a continuing page turning signal.

The first page turning module 602 can be configured to, in response to that the first receiving module 601 receives the continuing page turning signal, perform page turning on the pages according to a predefined single page turning mode.

The detecting module 603 can be configured to detect whether a page turning mode change condition is met.

The second page turning module 604 can be configured to, if it is detected by the detecting module 603 that the page turning mode change condition is met, perform page turning on the pages according to a predefined fast page turning mode, page turning speed of the fast page turning mode being larger than page turning speed of the single page turning mode.

In all, with the page turning apparatus provided by the embodiment of the invention, in response to receiving the continuing page turning signal, page turning is performed on the pages according to a predefined single page turning mode; when a page turning mode change condition is met in the terminal, page turning is performed on the pages according to a predefined fast page turning mode, and page turning speed of the fast page turning mode is larger than page turning speed of the single page turning mode; it solves the problem of requiring the focus point to continuously jump on the multiple lines of focused objects and the page turning instruction on the VOD pages when page-turning the VOD pages and wasting too long time; and it realizes effects of fast page turning and reduced page turning time.

Figure 7:
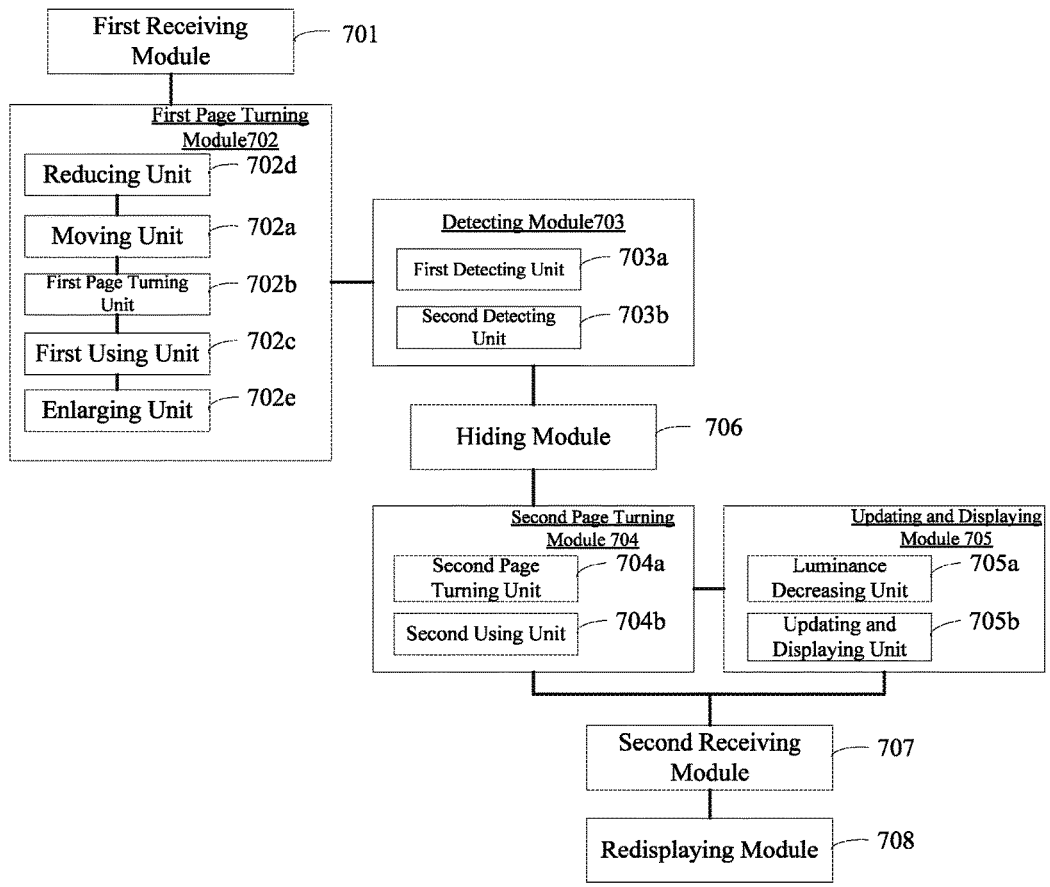
FIG. 7 is a structural illustrative diagram of an apparatus for page turning provided by another embodiment of the invention.

Now refer to FIG. 7, which shows a structural schematic diagram of a page turning apparatus provided by another embodiment of the invention. The page turning apparatus can be implemented as a terminal or a part of the terminal, and the terminal may be a multimedia television, a personal computer, a digital camera, a digital photo album, a cellular phone or an e-reader and so on. The terminal normally may display at least two sequential pages. The page turning apparatus may include but is not limited to: a first receiving module 701, a first page turning module 702, a detecting module 703 and a second page turning module 704.

The first receiving module 701 can be configured to receive a continuing page turning signal.

The first page turning module 702 can be configured to, in response to that the first receiving module 701 receives the continuing page turning signal, perform page turning on the pages according to a predefined single page turning mode.

Preferably, the pages are configured with at least one line and/or at least one column of focused objects, and the first page turning module 702 may include a moving unit 702a, a first page turning unit 702b and a first using unit 702c.

The moving unit 702a can be configured to move a focus point on a current page one jump by one jump, each moving jumping to a next focused object from a current focused object according to a direction directed by the continuing page turning signal.

The first page turning unit 702b can be configured to, when the focus point is moved onto a last focused object in the direction directed by the continuing page turning signal, turn the current page into a next page.

The first using unit 702c can be configured to use the next page after the first page turning unit's page turning as a new current page.

Preferably, the first page turning module 702 can further include: a reducing unit 702d and an enlarging unit 702e.

The reducing unit 702d can be configured to reduce and display all the pages.

The enlarging unit 702e can be configured to enlarge and display all the pages.

Typically, the enlarging unit 702e enlarges all the pages to a size before the reducing by the reducing unit 702d.

The detecting module 703 can be configured to detect whether a page turning mode change condition is met.

Preferably, the detecting module 703 can include a first detecting unit 703a or a second detecting unit 703b.

The first detecting unit 703a can be configured to detect whether the number of the turned pages, when the pages are being turned according to the predefined single page turning mode, is larger than a predefined turned page threshold.

The second detecting unit 703b can be configured to detect whether a duration of the continuing page turning signal exceeds a predefined duration threshold.

The second page turning module 704 can be configured to, if it is detected by the detecting module 703 that the page turning mode change condition is met, perform page turning on the pages according to a predefined fast page turning mode, page turning speed of the fast page turning mode being larger than page turning speed of the single page turning mode.

Preferably, the second page turning module 704 can include a second page turning unit 704a and a second using unit 704b.

The second page turning unit 704a can be configured to, at predetermined time intervals, slide and turn the current page into a next page in a direction directed by the continuing page turning signal.

The second using unit 704b can be configured to use the next page after the page turning of second page turning unit as a new current page.

Based on an aspect provided as above, in a first implementation, the page turning apparatus may further include a updating and displaying module 705.

The updating and displaying module 705 can be configured to, during the page turning on the pages according to the predefined fast page turning mode, update and display a page identifier of the current page in real time.

Preferably, the updating and displaying module 705 may include: a luminance decreasing unit 705a and an updating and displaying unit 705b.

The luminance decreasing unit 705a is configured to use all the pages as a background layer, and decrease a luminance of the background layer to a predefined threshold.

The updating and displaying unit 705b is configured to dispose a foreground layer in front of the background layer, update and display a page identifier of the current page on the foreground layer in real time.

Preferably, the page identifier is formed by at least one numerical value in at least one digit. The updating and displaying unit 705b may include: a comparing sub-unit, a maintaining sub-unit and an updating and displaying sub-unit.

The comparing sub-unit can be configured to compare the page identifier of the current page and the page identifier of the next page in accordance with the same digit.

The maintaining sub-unit can be configured to, for a digit having the same numerical value obtained from the comparison of the comparing sub-unit, maintain the numerical value unchanged in the digit.

The updating and displaying sub-unit can be configured to, for a digit having a different numerical value obtained from the comparison of the comparing sub-unit, update and display the numerical value corresponding to the digit in the page identifier of the next page.

Based on the first implementation, in the second implementation, the page turning apparatus may further include a hiding module 706.

The hiding module 706 is configured to hide the focus point.

Based on the first implementation or the second implementation, in the third implementation, the page turning apparatus may further include: a second receiving module 707 and a redisplaying module 708.

The second receiving module 707 is configured to receive an ending page turning signal.

The redisplaying module 708 is configured to in response to that the second receiving module receives the stopping page turning signal, stop the page turning on the pages according to the predefined fast page turning mode, and redisplay the focus point at a predefined position on the current page.

In all, with the page turning apparatus provided by the embodiment of the invention, in response to receiving the continuing page turning signal, page turning is performed on the pages according to a predefined single page turning mode; when a page turning mode change condition is met in the terminal, page turning is performed on the pages according to a predefined fast page turning mode, and page turning speed of the fast page turning mode is larger than page turning speed of the single page turning mode, and different animated operations are set for performing page turning in the single page turning mode and for performing page turning in the fast page turning mode, respectively; it solves the problem of requiring the focus point to continuously jump on the multiple lines of focused objects and the page turning instruction on the VOD pages when page-turning the VOD pages and wasting too long time; and it realizes effects of fast page turning and reduced page turning time as well as avoiding splash and so on.

It is to be noted that the page turning apparatus provided by the above embodiments are described in examples with respect to the individual functional modules when performing page turning, but in practice, the above functions can be implemented by different functional modules as needed, that is, the internal structure of the terminal can be divided into different functional modules to implement all or part of the above functions. In addition, the page turning apparatus and the page turning method provided by the above embodiments belong to the same concept, and as for particular implementations of the page turning apparatus, please see the method embodiments for details, which will not be described again herein.

The numbers of the embodiments of the invention are only for description, but not represent the quality of the embodiments.

A person skilled in the art may understand that all or parts of the steps for implementing the above embodiments can be realized by hardware, or by a program instructing related hardware, and said program can be stored in a computer readable storage medium, and the above-mentioned storage medium may be a Read-Only Memory, a disk or an optical disc and so on.

The above description shows only preferred embodiments of the invention, but is not intended to limit this invention, and any modifications, equivalences, alternations, or improvements and so on within the spirits and principles of the invention fall in the protection scope of the invention.

What is claimed is:

1. A method of an information processing apparatus for changing pages for display, the method comprising:
   receiving a single user input corresponding to a page change command;
   while the single user input corresponding to the page change command is being received,
      changing the displayed pages according to a predefined single page changing mode;
      detecting, by processing circuitry of the information processing apparatus, whether a page changing mode switch condition is met while the displayed pages are changed according to the predefined single page changing mode; and
      when the page changing mode switch condition is detected to be met, changing by the processing circuitry the displayed pages according to a predefined fast page changing mode, a page changing speed of the fast page changing mode being larger than a page changing speed of the single page changing mode; and
   terminating the changing of the displayed pages when the receiving of the single user input ends, wherein
   the changing the displayed pages according to the predefined fast page changing mode includes displaying page identifiers corresponding only to the displayed pages that are changed according to the predefined fast page change mode,
   each of the page identifiers is sequentially displayed within a page identifier display region located at a fixed position of a display area as the one of the pages corresponding to the respective page identifier is sequentially displayed,
   a luminance of the displayed pages that are changed according to the predefined fast page changing mode is less than a luminance of the displayed pages that are changed according to the predefined single page changing mode, and
   a luminance of the displayed page identifiers is higher than the luminance of the displayed pages that are changed according to the predefined fast page change mode.

2. The method according to claim 1, wherein the detecting whether the page changing mode switch condition is met includes:
   detecting whether a number of the displayed pages changed according to the predefined single page changing mode is larger than a predefined page threshold.

3. The method according to claim 1, wherein
   the pages are configured with at least one line and/or at least one column of focused objects, and
   the changing the displayed pages according to the predefined single page changing mode includes:
      moving a focus point on a current page one jump by one jump, each move jumping to a next focused object from a current focused object according to a direction directed by the single user input corresponding to the page change command;
      when the focus point is moved onto a last focused object in the direction directed by the single user input corresponding to the page change command, changing the current page into a next page; and
      using the next page after the page change as a new current page.

4. The method according to claim 3, further comprising:
   before moving the focus point on the current page one jump by one jump, each move jumping onto the next focused object from the current focused object according to the direction directed by the single user input corresponding to the page change command,
   reducing and displaying a first subset of the pages; and
   wherein the using the next page after the page change as the new current page includes:
      enlarging and displaying a second subset of the pages.

5. The method according to claim 1, wherein the changing the displayed pages according to the predefined fast page changing mode includes:
   at predetermined time intervals, sliding and changing a current page into a next page in a direction directed by the single user input corresponding to the page change command; and
   using the next page after the page change as a new current page.

6. The method according to claim 5, further comprising:
during the changing of the displayed pages according to the predefined fast page changing mode, updating the display of the page identifier of the current page in real time.

7. The method according to claim 6, wherein the updating the display of the page identifier of the current page in real time includes:
using all the pages as a background layer, and decreasing a luminance of the background layer to a predefined threshold; and
disposing a foreground layer in front of the background layer, and updating and displaying the page identifier of the current page on the foreground layer in real time.

8. The method according to claim 7, wherein
the page identifier is formed by at least one numerical value in at least one digit, and
the updating and the displaying the page identifier of the current page on the foreground layer in real time includes:
comparing the page identifier of the current page and the page identifier of the next page in accordance with the same digit;
for a digit having the same numerical value, maintaining the numerical value unchanged in the digit; and
for a digit having a different numerical value, updating the display of the numerical value corresponding to the digit in the page identifier of the next page.

9. The method according to claim 1, wherein the changing the displayed pages according to the predefined fast page changing mode further includes:
hiding a focus point;
wherein the method further includes:
receiving an end page change command;
in response to receiving the end page change command, stopping the changing of the displayed pages according to the predefined fast page changing mode; and
redisplaying the focus point at a predefined position on the current page.

10. An information processing apparatus, comprising:
processing circuitry configured to
receive a single user input corresponding to a page change command;
while the single user input corresponding to the page change command is being received,
change pages for display according to a predefined single page changing mode;
detect whether a page changing mode switch condition is met while the displayed pages are changed according to the predefined single page changing mode;
when the page changing mode switch condition is detected to be met, change the displayed pages according to a predefined fast page changing mode, a page changing speed of the fast page changing mode being larger than a page changing speed of the single page changing mode; and
terminate the displayed page changes when the receiving of the single user input ends, wherein
the processing circuitry is configured to display, in the predefined fast page changing mode, page identifiers corresponding only to the displayed pages that are changed according to the predefined fast page change mode,
each of the page identifiers is sequentially displayed within a page identifier display region located at a fixed position of a display area as the one of the pages corresponding to the respective page identifier is sequentially displayed,
a luminance of the displayed pages that are changed according to the predefined fast page changing mode is less than a luminance of the displayed pages that are changed according to the predefined single page changing mode, and
a luminance of the displayed page identifiers is higher than the luminance of the displayed pages that are changed according to the predefined fast page change mode.

11. The information processing apparatus according to claim 10, wherein the processing circuitry is further configured to
detect whether a number of the displayed pages changed according to the predefined single page changing mode is larger than a predefined page threshold.

12. The information processing apparatus according to claim 10, wherein
the pages are configured with at least one line and/or at least one column of focused objects, and
the processing circuitry is further configured to
move a focus point on a current page one jump by one jump, each move jumping to a next focused object from a current focused object according to a direction directed by the single user input corresponding to the page change command;
when the focus point is moved onto a last focused object in the direction directed by the single user input corresponding to the page change command, change the current page into a next page; and
using the next page after the page change as a new current page.

13. The information processing apparatus according to claim 10, wherein the processing circuitry is further configured to
reduce and display a first subset of the pages; and
enlarge and display a second subset of the pages.

14. The information processing apparatus according to claim 10, wherein the processing circuitry is further configured to
at predetermined time intervals, slide and change a current page into a next page in a direction directed by the single user input corresponding to the page change command; and
use the next page after the page change as a new current page.

15. The information processing apparatus according to claim 14, wherein the processing circuitry is further configured to
during the displayed page change according to the predefined fast page changing mode, update the display of the page identifier of the current page in real time.

16. The information processing apparatus according to claim 15, wherein the processing circuitry is further configured to
use all the pages as a background layer, and decrease a luminance of the background layer to a predefined threshold; and
dispose a foreground layer in front of the background layer, and update the display of the page identifier of the current page on the foreground layer in real time.

17. The information processing apparatus according to claim 16, wherein
the page identifier is formed by at least one numerical value in at least one digit, and the processing circuitry is further configured to
compare the page identifier of the current page and the page identifier of the next page in accordance with the same digit;
for a digit having the same numerical value obtained from the comparison, maintain the numerical value unchanged in the digit; and
for a digit having a different numerical value obtained from the comparison, update the display of the numerical value corresponding to the digit in the page identifier of the next page.

18. The information processing apparatus according to claim 10, wherein the processing circuitry is further configured to
hide a focus point;
receive an end page change command; and
in response to the received end page change command, stop the displayed page change according to the predefined fast page changing mode and redisplay the focus point at a predefined position on a current page.

19. A terminal, comprising the information processing apparatus according to claim 10.

20. A non-transitory computer readable medium, with a computer executable program stored thereon, the computer executable program, when executed by a computer causes the computer to perform a method of changing pages for display, the method comprising:
receiving a single user input corresponding to a page change command;
while the single user input corresponding to the page change command is being received,
changing the displayed pages according to a predefined single page changing mode;
detecting whether a page changing mode switch condition is met while the displayed pages are changed according to the predefined single page changing mode; and
when the page changing mode switch condition is detected to be met, changing the displayed pages according to a predefined fast page changing mode, a page changing speed of the fast page changing mode being larger than a page changing speed of the single page changing mode; and
terminating the changing of the displayed pages when the receiving of the single user input ends, wherein
the changing the displayed pages according to the predefined fast page changing mode includes displaying page identifiers corresponding only to the displayed pages that are changed according to the predefined fast page change mode,
each of the page identifiers is sequentially displayed within a page identifier display region located at a fixed position of a display area as the one of the pages corresponding to the respective page identifier is sequentially displayed,
a luminance of the displayed pages that are changed according to the predefined fast page changing mode is less than a luminance of the displayed pages that are changed according to the predefined single page changing mode, and
a luminance of the displayed page identifiers is higher than the luminance of the displayed pages that are changed according to the predefined fast page change mode.

21. The method according to claim 1, wherein the single user input is held by a user in a steady state during the changing of the displayed pages according to the predefined single page changing mode, the detecting of whether the page changing mode switch condition is met, and the changing of the displayed pages according to the predefined fast page changing mode.

* * * * *